(12) United States Patent
El-Ibiary

(10) Patent No.: US 6,323,619 B1
(45) Date of Patent: Nov. 27, 2001

(54) CONDITION MONITORING AND BATTERY RECHARGING SYSTEM

(75) Inventor: Yehia El-Ibiary, Simpsonville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/675,308

(22) Filed: Sep. 29, 2000

(51) Int. Cl.[7] .......................... H01M 10/44; H01M 10/46
(52) U.S. Cl. ................................................ 320/107
(58) Field of Search .............................. 320/101, 104, 320/107, 112, 123, DIG. 33, DIG. 34; 324/426, 433

(56) References Cited

U.S. PATENT DOCUMENTS

| | | |
|---|---|---|
| 4,685,527 | 8/1987 | Oswald et al. . |
| 4,798,053 | 1/1989 | Chang . |
| 5,685,650 | 11/1997 | Martinie et al. . |
| 5,746,452 | 5/1998 | El-Ibiary et al. . |
| 5,844,501 | * 12/1998 | El-Ibiary . |
| 5,889,383 | * 3/1999 | Teich ................................... 320/107 |
| 5,889,384 | 3/1999 | Hayes et al. . |
| 6,028,418 | 1/2000 | Jovanovic et al. . |
| 6,057,668 | 5/2000 | Chao . |

* cited by examiner

Primary Examiner—Edward H. Tso
(74) Attorney, Agent, or Firm—Jeffrey M. Karmilovich; Alexander M. Gerasimow; William R. Walbrun

(57) ABSTRACT

A system for monitoring a characteristic of a dynamic member is disclosed. The system includes a sensor device operative to sense the characteristic of the dynamic member and to generate a first signal in response to the sensed characteristic. A monitor is in communication with the sensor device, the monitor wirelessly transmitting a second signal responsive to the first signal. A battery is in electrical communication with the sensor device and monitor. The sensor device charges the battery via the first signal, the battery powering the monitor.

36 Claims, 5 Drawing Sheets

CONDITION MONITORING AND BATTERY RECHARGING SYSTEM

BACKGROUND OF THE INVENTION

The present invention relates to a condition monitoring and battery recharging system that can be used to monitor a characteristic of a dynamic member. More particularly, the present invention relates to a system for monitoring a characteristic such as speed, vibration, or temperature of a dynamic member such as a rotatable member while simultaneously powering the monitoring system using a signal generated by the monitoring system.

The various types of machinery generally found in an industrial setting will often utilize bearings, speed reducers, motors, or other such mechanical components. For example, a single conveyor will frequently be equipped with multiple pillow block or flange bearings to support its various rotatable shafts. Speed reducers or other gear boxes may be utilized to transmit mechanical power to the machinery from a suitable prime mover.

The status of these mechanical and electrical components is often monitored during operation to determine when some form of corrective action should be taken. For example, the temperature of a bearing can be monitored to lessen the occurrence of overheating which can cause failure. It is also frequently desirable to monitor the rotational speed of a rotatable member such as a shaft to which a bearing is attached, or a shaft of a prime mover such as an electrical motor. Also, vibration may be monitored. To facilitate such monitoring, the various mechanical components can be equipped with a plurality of sensors.

The signal information provided by the various sensors may be processed at a central monitoring controller. In the past, however, dedicated transmission lines have typically been provided for each of the sensors. As a result, several transmission lines could be required between each of the mechanical components and a central monitoring facility. To reduce the number of transmission lines, it has been proposed to provide a central communication bus to thereby simplify the provided wiring. Such a system is disclosed in U.S. Pat. No. 5,844,501, owned by Applicant's Assignee and incorporated by reference herein.

While such system is useful for its intended purpose, wiring is still required to be connected to the sensors disposed on each of the electronic components. Also, a separate power source must be provided to each sensor device if it includes any non-passive components such as a processor, transmitter, etc. To further reduce wiring requirements, batteries may be provided for non-passive components in such systems. An inherent drawback of batteries is their finite life, requiring periodic replacement or recharging of the batteries.

OBJECTIVES AND SUMMARY OF THE INVENTION

It is therefore an objective of the invention to provide a system for monitoring a characteristic of a dynamic member, where the system is simple and economical to install and operate, and is reliable in use.

According to one aspect of the invention, a system for monitoring a characteristic of a dynamic member is provided, the system including a sensor device operative to sense the characteristic of the dynamic member and to generate a first signal in response to the sensed characteristic. A monitor is in communication with the sensor device, the monitor wirelessly transmitting a second signal responsive to the first signal. A battery is in electrical communication with the sensor device and monitor, the sensor device charging the battery via the first signal, the battery powering the monitor.

The measured characteristic may be a rotational speed or acceleration, a vibration, or a temperature of the dynamic member. A warning device may be provided to generate a warning signal responsive to the first signal. The warning device may be an aural or a visual device. The battery may be disposed within a wireless monitor module and may be removably securable proximate the dynamic member.

The device may further include a signal generating device attached to a rotatable member and cooperating with the sensor device to generate the first signal. The sensor device is preferably a magnetic sensor. If a magnetic sensor, the sensor device may be a reluctance sensor or a tachometer. The tachometer can be used as a speed indicator and a DC generator.

According to another aspect of the invention, a system is disclosed for monitoring a rotatable member rotatably mounted within a housing, the system including an adapter nut secured to the rotatable member to rotatably mount the rotatable member within the housing. A sensor is operative to sense a rate of rotation of the rotatable member by sensing a rotation of the adapter nut and to generate an electrical signal in response to the sensed rotation. A monitor is in communication with the sensor for receiving and monitoring the electrical signal. A battery is in communication with and powers the monitor. A battery charging circuit in communication with the battery, the battery charging circuit being electrically connected to and powered by the electrical signal generated by the sensor. The battery is recharged when the sensor generates the electrical signal.

The sensor may be an encapsulated generator extending through the housing proximate the adapter nut. The monitor may wirelessly transmit a second signal responsive to the electrical signal, the second signal being indicative of the rate of rotation of the rotatable member. The monitor can also send signals indicative of the condition of the equipment such as vibration and temperature.

According to another aspect of the invention, a method of remote monitoring of a dynamic member comprises sensing a characteristic of the dynamic member, generating a first electrical signal in response to the sensed characteristic, charging a battery via the first electrical signal, and powering a transmitter with the battery to wirelessly transmit a second electrical signal responsive to the first signal to a remote location, the second signal indicative of the sensed characteristic.

The sensing step may include magnetically sensing a rotational speed using a coil, and the generating step may include magnetically generating the first electrical signal using a coil.

These and other objects, features, and aspects of the present invention are achieved by various elements and steps of the present invention which are discussed at greater detail below and are set forth in the drawings below.

DETAILED DESCRIPTION OF THE PREFERRED EMBODIMENT

Figure 1:
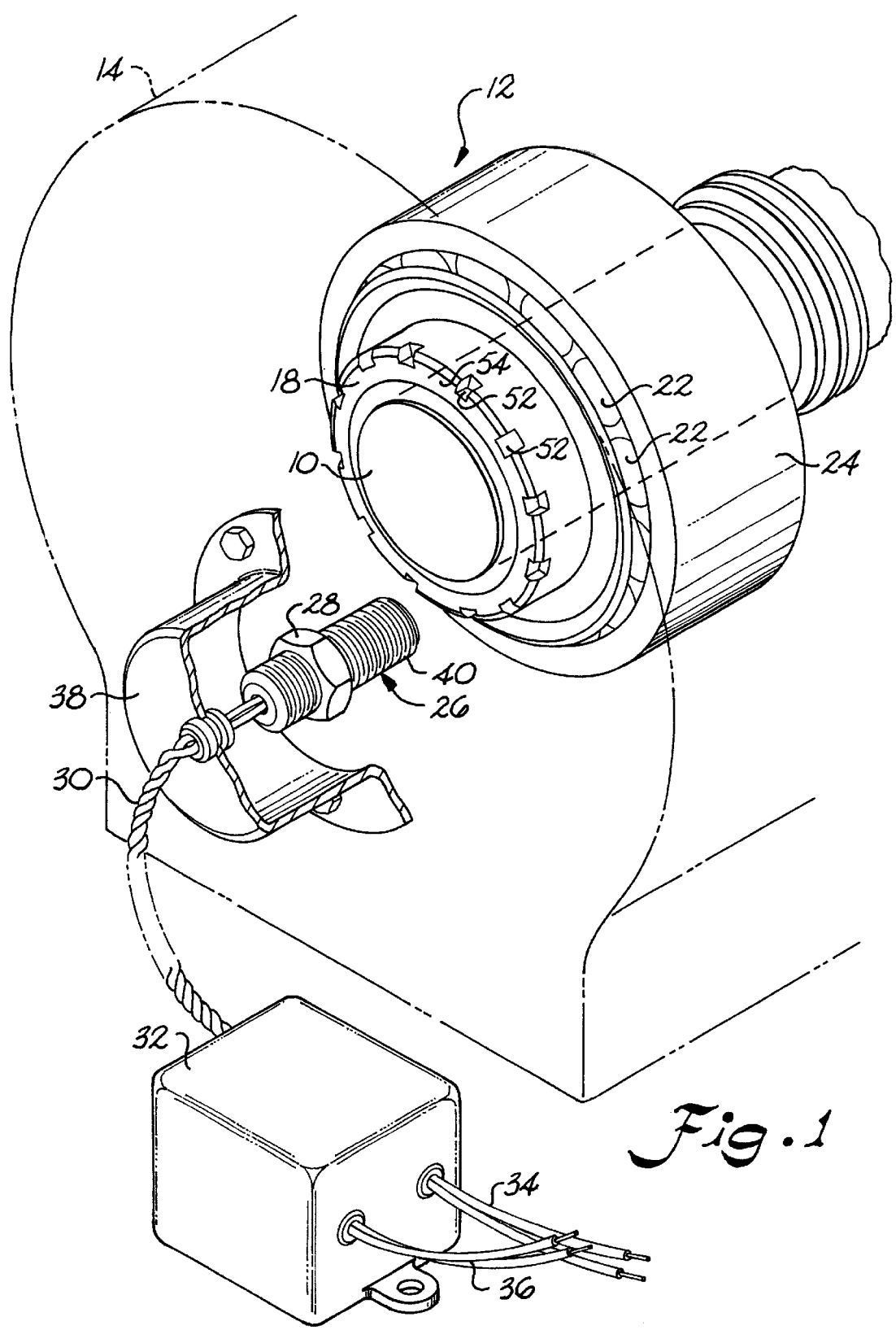
FIG. 1 is a perspective representation of a sensor and monitor module secured adjacent a rotatably mounted shaft according to one aspect of the present invention.

It is to be understood by one of ordinary skill in the pertinent art that the following description of exemplary embodiments is not intended as limiting the broader aspects of the present invention, which is defined by the scope of the appended claims and their equivalents.

FIGS. 1–5 show various aspects of a system for monitoring a characteristic of a dynamic member according to the present invention. As broadly disclosed, such system can be used to monitor a rotatable member 10 mounted in a bearing assembly 12. As shown, by way of example only, the rotatable member 10 may be a shaft mounted within a bearing assembly housing 14. Rotatable member 10 may be mounted within a tapered adapter 16 via an adapter nut 18. The tapered adapter 16 is in turn supported within an inner ring 20 of the bearing assembly via rollers 22 and an outer ring 24. Adapter 16 and inner ring 20 cooperate with adapter nut 18 to form a pull-type mounting assembly, as is known to those skilled in the art.

It should be understood for purposes of the present invention that rotatable member 10 can be any type of rotatable member, whether a drive member or a driven member, within the scope of the invention. Thus, the pull-type assembly mounted shaft shown and described herein is an exemplary embodiment of a dynamic member, as will be described below. No further detail need be given regarding the rotatable member and the bearing assembly to appreciate the present invention.

Figure 2:
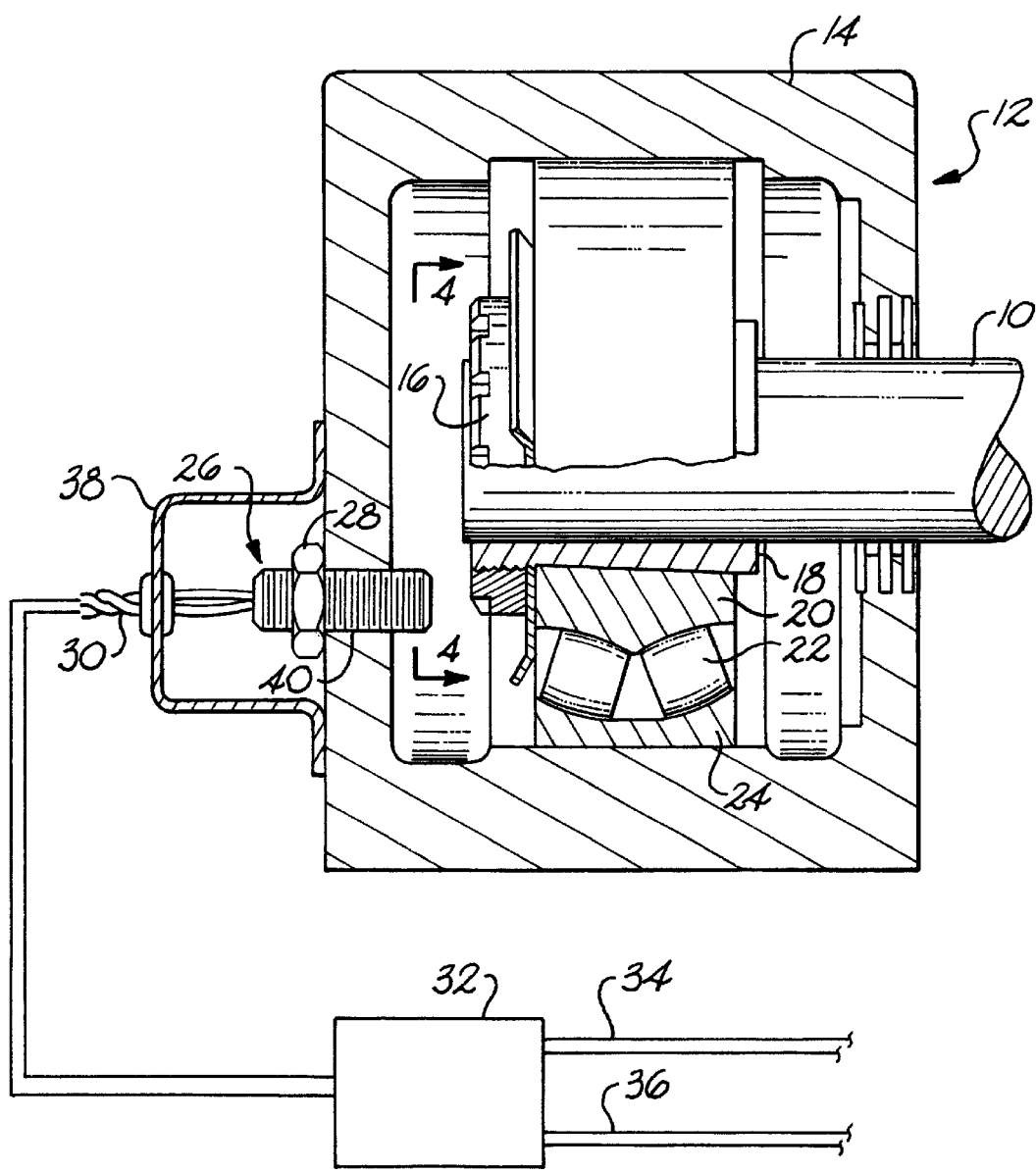
FIG. 2 is a cross-sectional view of the arrangement of FIG. 1.

As shown in FIGS. 1 and 2, a sensor device 26 is secured to housing 14. Sensor device 26 may be externally threaded and may be secured within a threaded opening in housing 14. A nut 28 may be provided around sensor device 26 to secure the sensor device in place and position it properly. Two lead wires 30 extend from sensor device 26 to a wireless transmitting module 32. Other lead wires 34, 36, may also extend to wireless transmitting module from other sensors (not shown). A cover 38 may be provided over sensor device 26 for protection against damage to the sensor device and wiring connection.

Sensor device 26 is operative to sense a characteristic of the rotatable member 10 and to generate a first signal in response to the sensed characteristic. According to a preferred embodiment of the invention, sensor device 26 may be an encapsulated signal generator disposed proximate rotatable member 10 for sensing a speed of rotation or acceleration of the rotatable member.

Figure 3:
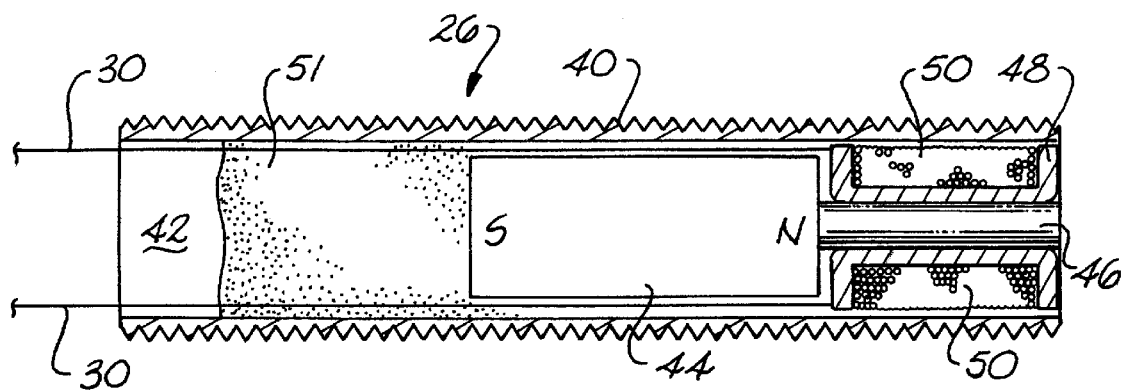
FIG. 3 is a cross-sectional view of one embodiment of a sensor device according to the present invention.

As broadly shown in FIG. 3, sensor device 26 may thus include a threaded member 40 including a central opening 42. A two-pole magnet 44 is located within the opening. A pole piece 46 extends at one end of magnet 44. The pole piece 46 is surrounded by a bobbin 48 about which is wound a magnetic coil 50. Magnet 44 may be held in place via an epoxy 51.

Wires 30 extend from the ends of coil 50 through epoxy 51 to the wireless transmitting module 32. AC current is generated in coil 50 by movement of adjacent ferric metal elements.

For example, as shown in FIGS. 1 and 2, adjusting nut 18 may include surface irregularities that generate a varying magnetic signature as the nut rotates with the rotatable member 10. FIGS. 1 and 2 illustrate that the varying magnetic signature may be generated by providing at least one slot 52 on an outer portion 54 of the adjusting nut 18. Thus, as member 10 and nut 18 rotate, the movement of slots 52 past sensor device 26 creates irregularities in the magnetic flux extending about the magnet 44, thereby inducing an AC current signal in wires 30, according to well known principles. The number of voltage pulses is indicative of the rotational speed of the rotatable member 10, dependent of course on the number of slots 52 utilized. Change in rate of pulses is indicative of acceleration. Sensor device 26 may thus comprise a reluctance type pick-up sensor. Alternately, sensor device 26 may comprise a tachometer, which can function as a speed indicator and a DC generator.

Figure 5:
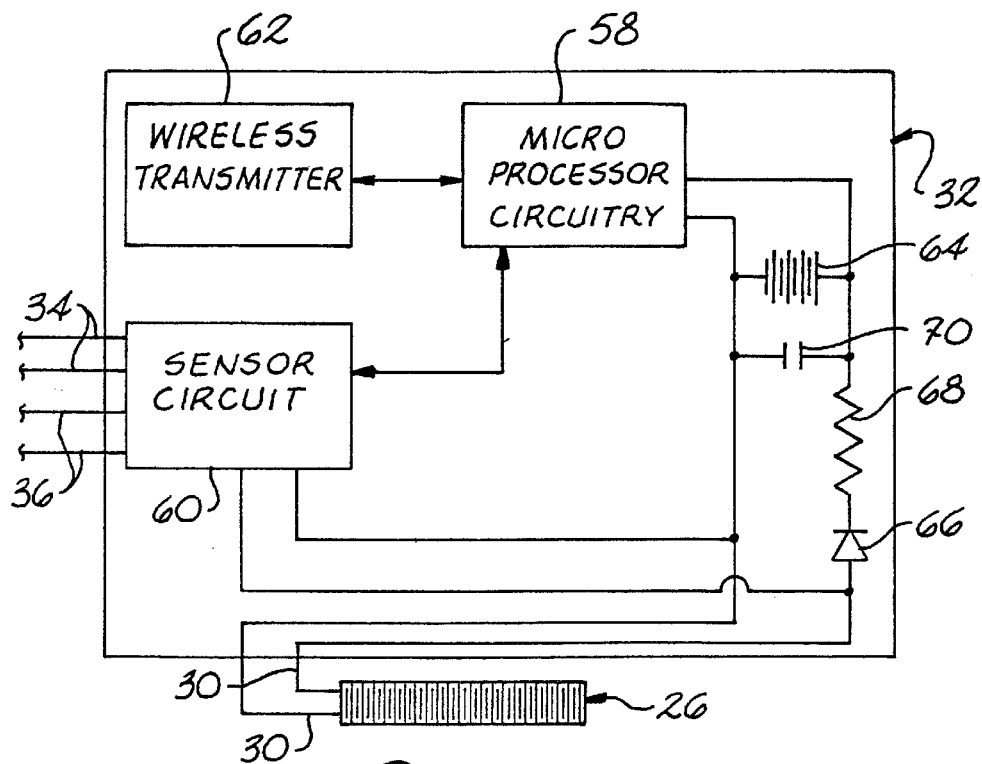
FIG. 5 is a diagrammatical representation of the arrangement of FIG. 1.
Figure 7:
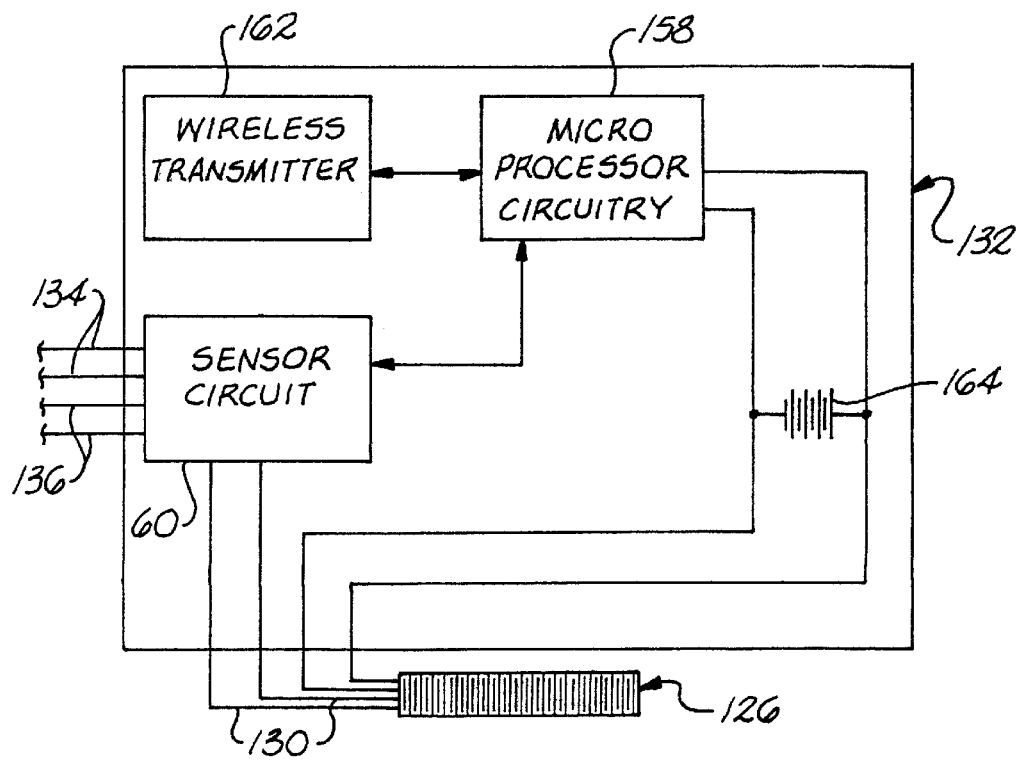
FIG. 7 is a diagrammatical representation of an alternative arrangement of components according to the present invention and including the sensor device of FIG. 6.

FIG. 5 shows the sensor device connected to a wireless transmission module 32, as well as some internal components of a first embodiment of the wireless transmission module. As shown in FIG. 5, wireless transmitting module includes an AC/DC conversion circuit 56, a microprocessor 58, a sensor circuit 60, a wireless transmitter 62, and a battery 64. Microprocessor 58, sensor circuit 60, and wireless transmitter 62 may be considered a monitor. Conversion circuit 56 includes a dioide 66, a resistor 68, and a capacitor 70. Alternately, if desired a 4-dioide full wave rectifier may be utilized as conversion circuit 56. Thus, conversion circuit 56 also acts as a battery charging circuit. Either way, conversion circuit 56 provides a DC current for powering (i.e., charging) battery 64 and/or wireless transmitting module 32. The DC current supplied results from the AC current generated by the position sensing performed by sensor device 26.

Sensor circuit 60 is provided to receive and process the AC voltage output signal of sensor device 26. As shown in FIG. 5, sensor circuit may also receive input from various other sensors (not shown) for sensing various other characteristics of a dynamic member, which could be the rotatable member 10 or some other related or unrelated member or device. Thus, wires 34, 36 may provide input into sensor circuit 60 from other such sensors.

Microprocessor 58 may include programmed logic or may be hardwired to process the input received by sensor circuit 60. Microprocessor may compare the magnitude of sensed characteristic information to predetermined levels to thereby evaluate the condition of the dynamic member. If the sensed characteristic is, for example, rotational speed, the microprocessor may be programmed to provide certain outputs if the speed goes above a certain limit, below a certain limit, or varies from a certain limit. If so, the microprocessor may generate a warning signal, if desired. That signal may be then used to modify parameters of the system or may be converted to a visual or aural signal so that an operator may give attention to the dynamic member, shut down the system, etc. Accordingly, microprocessor 58 may include memory, processing, and communication modules to perform these functions. Microprocessor 58 is in communication with wireless transmitter 62.

According to the invention, the wireless transmitter is provided for transmitting a second signal based on the first signal generated by the sensor device. The transmitted signal may comprise or be indicative of the characteristic or the magnitude of the characteristic measure by sensor device 26. Wireless transmitting module 32 is powered by battery 64, which is charged by the voltage potential generated initially by sensor device 26. Thus, the results of the sensing may be transmitted remotely for monitoring via use of the power generated by the sensing and stored in the battery. Battery 64 thus remains charged so long as sensor device 26 senses sufficient movement of member 10 to generate enough voltage to charge the battery. While sensor device 26 has been illustrated as a magnetic coil device, other sensor devices, such as a tachometer, could be employed to the extent that they could generate enough voltage to charge battery 64. Also, the additional sensors (not shown) connected to wires 34 and 36 could be of any type, as these sensors are not required to generate DC voltage, although they could if so desired.

Figure 4A:
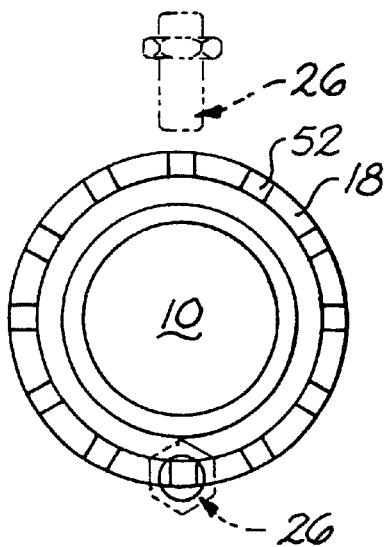
FIGS. 4A–4D are diagrammatical representations of optional arrangements of sensors and signal generating devices according to the present invention.
Figure 4B:
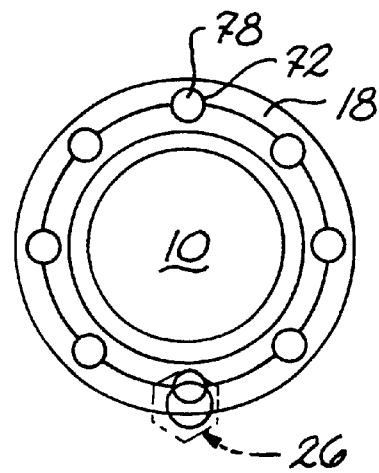
Figure 4C:
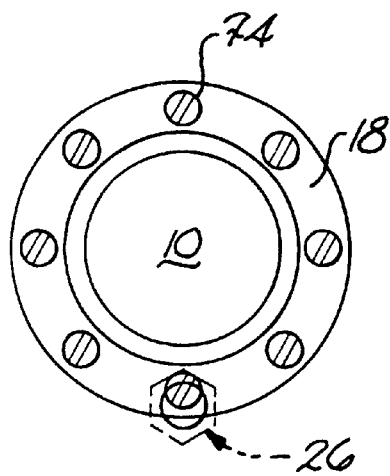
Figure 4D:
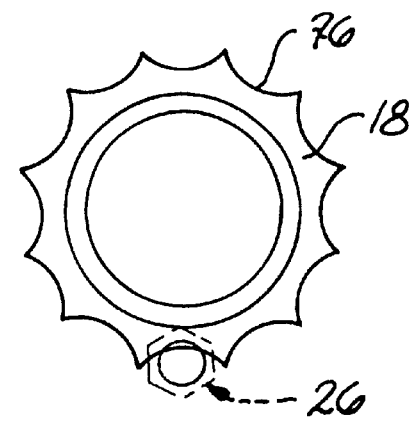

FIG. 1 shows sensor device 26 disposed axially relative to member 10. However, it should be understood that sensor device could also be disposed in other directions, such as radially, as indicated in FIG. 4A. Also, as shown in FIGS. 4A–4D, slots 52 may be replaced with other shapes or elements, either on member 10, nut 18, or secured to one of these elements. FIG. 4A shows radial or axial locations for sensing slots 52. FIG. 4B shows axial sensing of holes 72 in nut 18, FIG. 4C shows axial sensing of screw heads 74, and FIG. 4D shows axial sensing of cut out arcuate portions 76. Holes 72 may include plugs 73 to provide further variance in magnetic signature. Each of elements 52, 72, 74, and 76 provides a differing magnetic signature as it rotates with member 10 to thereby induce an AC current within coil 50. It should be understood that elements 52, 72, 74, and 76 could also be disposed on some object other than nut 18, for example an end of the rotatable member 10, if desired.

Figure 6:
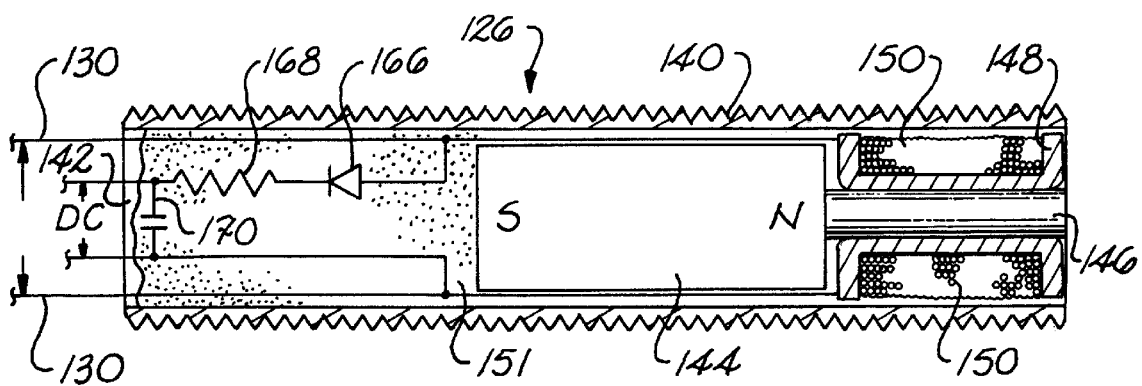
FIG. 6 is a cross-sectional view of another embodiment of a sensor device according to the present invention.

FIG. 6 shows an alternate sensor device 126. In this device, a converter circuit 156 is provided within threaded member 140. Thus, a diode 166, resistor 168, and capacitor 170 are provided within sensor device 126 itself, not the wireless transmitting module. Two sets of wires 130, 131 extend from sensor device 126. A first set of the wires 130 provides an AC output signal akin to that provided by wires 30 in the first embodiment. A second set of the wires 131 provides a DC voltage for charging battery 164 within wireless transmitting module 132. The operation of wireless transmitting module 132 is essentially the same as module 32.

The invention also includes a method of remote monitoring of a dynamic member. The method includes the steps of sensing a characteristic of the dynamic member. The characteristic may be speed, acceleration, temperature, or vibration of a member such as a rotatable member. The method also includes generating a first electrical signal in response to the sensed characteristic and charging a battery via the first electronic signal. The method also includes powering a transmitter with the battery to wirelessly transmit a second electrical signal responsive to the first signal to a remote location. The second signal is indicative of the sensed characteristic.

It should be apparent from the above description that many alternatives are available for carrying out the present invention in combination with various applications. Thus, the present invention is not limited to the specific exemplary embodiments of sensors, circuits, etc. disclosed herein.

While preferred embodiments of the invention have been shown and described, modifications and variations may be practiced by those of ordinary skill in the art without departing from the spirit and scope of the present invention which is more particularly set forth in the appended claims. In addition, it should be understood that aspects of the various embodiments may be interchanged both in whole or in part. Those of ordinary skill in the art will appreciate that the foregoing descriptions are by way of example only and are not intended to limit the invention so further described in the appended claims.

What is claimed is:

1. A system for monitoring a characteristic of a dynamic member, the system comprising:
    a sensor device operative to sense the characteristic of the dynamic member and to generate a first signal in response to the sensed characteristic;
    a monitor in communication with the sensor device, the monitor wirelessly transmitting a second signal responsive to the first signal; and
    a battery in electrical communication with the sensor device and monitor, the sensor device charging the battery via the first signal, the battery powering the monitor.

2. A system as set forth in claim 1, wherein the characteristic is rotational speed.

3. A system as set forth in claim 1, wherein the characteristic is vibration.

4. A system as set forth in claim 1, wherein the characteristic is temperature.

5. A system as set forth in claim 1, wherein the first signal includes speed, vibration, and temperature signals.

6. A system as set forth in claim 1, further comprising a warning device in communication with the monitor for generating a warning signal responsive to the first signal.

7. A system as set forth in claim 6, wherein the warning device is an aural device.

8. A system as set forth in claim 6, wherein the warning device is a visual device.

9. A system as set forth in claim 1, wherein the battery is disposed within the monitor, the monitor being removably securable proximate the dynamic member.

10. A system as set forth in claim 1, wherein the battery is disposed proximate the monitor, the battery being removably securable proximate the dynamic member.

11. A system as set forth in claim 1, wherein the dynamic member is rotatable, the system further comprising a bearing apparatus defining a housing, an outer ring, and an inner ring such that the outer ring rotates relative to and the inner ring rotates with the rotatable member, the housing and the outer ring supporting the inner ring, the sensor device being secured to the housing.

12. A system as set forth in claim 11, wherein the bearing apparatus includes:
    a tapered adapter disposed about the rotatable member, the adapter including a tapered portion and an external threaded portion;
    the inner ring defining a tapered inner surface disposed about the tapered portion of the adapter; and
    an adapter nut disposed to engage the threaded portion of the tapered adapter to clamp the bearing apparatus to the rotatable member.

13. A system as set forth in claim 1, further including a signal generating device attached to the rotatable member, the signal generating device cooperating with the sensor device to generate the first signal.

14. A system as set forth in claim 13, wherein the signal generating device is an adapter nut utilized to secure the rotatable member to a rotatable portion of a housing in which the rotatable member rotates.

15. A system as set forth in claim 13, wherein the signal generating device defines a plurality of slots spaced about a circumference thereof.

16. A system as set forth in claim 13, wherein the signal generating device defines a plurality of holes spaced about a circumference thereof.

17. A system as set forth in claim 13, wherein the signal generating device defines a plurality of plug members spaced about a circumference thereof.

18. A system as set forth in claim 13, wherein the signal generating device defines a magnetic signature different from that of an area adjacent the signal generating device.

19. A system as set forth in claim 1, wherein the sensor device is situated in an axial sensing direction with respect to the dynamic member.

20. A system as set forth in claim 1, wherein the sensor device is situated in a radial sensing direction with respect to the dynamic member.

21. A system as set forth in claim 1, wherein the sensor device is a magnetic sensor.

22. A system as set forth in claim 21, wherein the magnetic sensor is a reluctance sensor.

23. A system for monitoring a rotatable member rotatably mounted within a housing, the system comprising:

an adapter nut secured to the rotatable member to rotatably mount the rotatable member within the housing;

a sensor operative to sense a rate of rotation of the rotatable member by sensing a rotation of the adapter nut and to generate an electrical signal in response to the sensed rotation;

a monitor in communication with the sensor for receiving and monitoring the electrical signal;

a battery in communication with and powering the monitor; and a battery charging circuit in communication with the battery, the battery charging circuit being electrically connected to and powered by the electrical signal generated by the sensor, whereby the battery is recharged when the sensor generates the electrical signal.

24. A system as defined in claim 23, wherein the sensor is an encapsulated generator extending through the housing proximate the adapter nut.

25. A system as defined in claim 24, wherein the encapsulated generator includes a magnetic coil, and the battery charging circuit is disposed within the encapsulated generator.

26. A system as defined in claim 23, wherein the battery charging circuit includes a diode to generate single-pole current.

27. A system as defined in claim 23, wherein the battery charging circuit includes a full-wave rectifier to generate positive and negative current.

28. A system as defined in claim 23, wherein the monitor wirelessly transmits a second signal responsive to the electrical signal, the second signal indicative of the rate of rotation of the rotatable member.

29. A system as defined in claim 23, further including a warning device for producing a warning indicative of the rate of rotation of the rotatable member.

30. A method of remote monitoring of a dynamic member comprising:

sensing a characteristic of the dynamic member;

generating a first electrical signal in response to the sensed characteristic;

charging a battery via the first electrical signal; and powering a transmitter with the battery to wirelessly transmit a second electrical signal responsive to the first signal to a remote location, the second signal indicative of the sensed characteristic.

31. The method of claim 30, further comprising providing a warning based on the second electrical signal.

32. The method of claim 30, wherein the sensed characteristic is rotational speed.

33. The method of claim 30, wherein the sensed characteristic is temperature.

34. The method of claim 30, wherein the sensed characteristic is vibration.

35. The method of claim 30, wherein the sensing step includes magnetically sensing a rotational speed using a coil and a magnet.

36. The method of claim 30, wherein the generating step includes magnetically generating the first electrical signal using a coil and a magnet.

* * * * *